(12) United States Patent
Gurreri et al.

(10) Patent No.: US 7,461,983 B1
(45) Date of Patent: Dec. 9, 2008

(54) FIELD-INSTALLABLE OPTICAL SPLICE

(75) Inventors: Michael Lawrence Gurreri, York, PA (US); Lou Castagna, Middletown, PA (US); David Donald Erdman, Hummlestown, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/949,435

(22) Filed: Dec. 3, 2007

(51) Int. Cl.
*G02B 6/255* (2006.01)
(52) U.S. Cl. .............................. 385/99; 385/95; 385/98
(58) Field of Classification Search .............. 385/98–99
See application file for complete search history.

(56) References Cited

U.S. PATENT DOCUMENTS

| | | | |
|---|---|---|---|
| 5,085,494 A | 2/1992 | Wesson et al. | |
| 5,201,019 A | 4/1993 | Gallusser et al. | |
| 5,469,522 A | 11/1995 | Fan | |
| 6,439,780 B1 * | 8/2002 | Mudd et al. ................... | 385/83 |
| 2005/0191014 A1 | 9/2005 | Renfro, Jr. et al. | |

OTHER PUBLICATIONS

Siemon Fiber Optic Splicing Products, The Siemon Company, PROD-SS-FSP Rev. A Jun. 2001.
CamSplice No-Adhesive Mechanical Splice, Product Specifications, Corning Cable Systems, LLC, Hickory, NC, 2001.
Mechanical Splice FMS-205, Product Specifications, Fujikura Ltd., Tokyo, Japan, 2008.
Recordsplice, Connectivity solutions for fiber access networks, Imagine fiber connectivity becomes like copper . . . , Product data, Tyco Electronics, Belgium, 2007.

* cited by examiner

*Primary Examiner*—Michelle R. Connelly-Cushwa
*Assistant Examiner*—Chris Chu

(57) ABSTRACT

A splice for connecting two segments of optical fiber cable, the splice comprising: (a) an elongated housing having a first end with a first opening, a second end with a second opening, and a central cavity, the housing being essentially seamless between the first and second ends; (b) a clamping mechanism disposed in the central cavity and comprising at least a platform defining a fiber-receiving channel open to both first and second openings, a first member adjacent to the fiber-receiving channel and having at least one cam surface, and a second member having a second cam surface, the first and second cam surfaces cooperating such that relative movement of the first and second members toward the first end causes the first member to move toward the fiber-receiving channel and an actuator to cause relative movement of the first and second members toward the first end; (c) a first buffer crimp disposed at the first opening; and (d) a second buffer crimp disposed at the second opening.

20 Claims, 7 Drawing Sheets

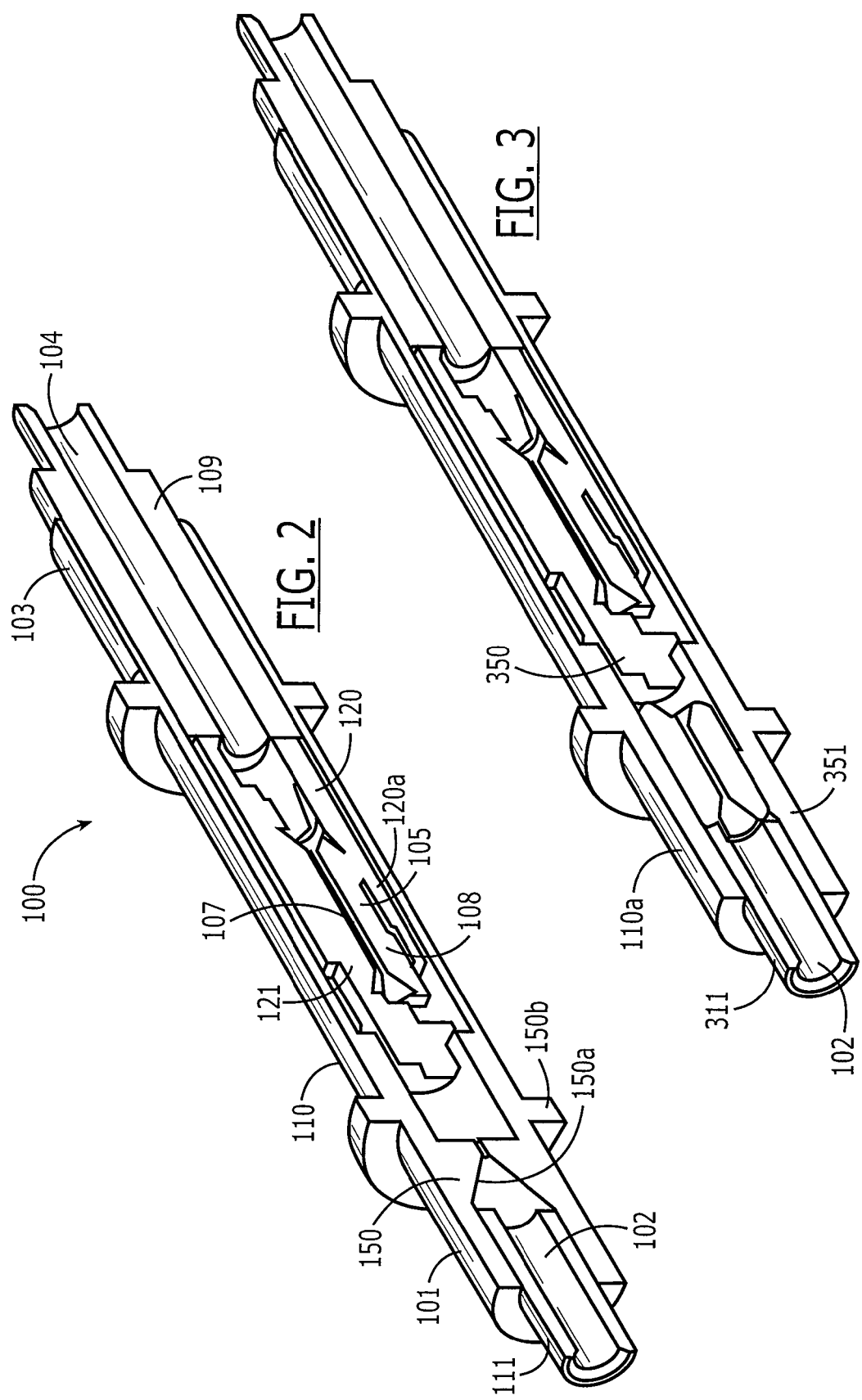

FIELD-INSTALLABLE OPTICAL SPLICE

FIELD OF INVENTION

The present invention relates generally to an optical splice, and, more specifically, to a field-installable splice for optical fiber cables of varying diameter.

BACKGROUND OF INVENTION

Optical fiber cables (herein "cables") are ubiquitous in data and telecommunications. A typical cable comprises an optical fiber encased by a buffer, which protects the fiber and provides strength to the cable. The diameter of a buffered fiber typically ranges from 250 to 900 µm depending upon the application. Cables are also frequently jacketed in which aramide strength members surround the buffer and are encased in a protective polymeric sheathing. These cables, both jacketed and non-jacketed, form the backbone of essentially all optical communications.

Frequently, cables must be connected together to effect an optical coupling between them. This connection is performed using a splice. Although splices are common and well known in the art, Applicants have identified a number of properties that splices should possess, but few do.

First, a splice must hold the cables such the fibers are in optical alignment. This requires aligning the core of one fiber with the core of the other. Considering that cores for multimode fibers are only 50/62.5 µm, and those for single mode fibers are even smaller at 8/10 µm, tolerances for radial offset can be as low as 1 µm. Thus, extremely accurate and precise positioning of the fibers is necessary to achieve suitable optical coupling.

Second, since different cables must be connected in networks in the field, a splice should be field installable, meaning a technician should be able to use relatively simple tools to optically couple the fibers in a simple and reliable way.

Third, the splice must be durable and resilient to common environmental assaults such as dirt and debris. If dirt or other debris is able to penetrate the housing, it can wreak havoc with the mechanism that effects the splice or even degrade the optical performance of the splice.

Fourth, the splice should be structurally robust and resist pulling forces on the cables it joins. To this end, Applicants have recognized that transferring the axial forces on the cable to a load bearing component of the splice and away from the clamping mechanism of the splice provides for the most robust design. Transferring these forces to a load bearing component is particularly important with respect to jacketed fibers. That is, the splice should be capable of accommodating jacketed fibers and exploiting the strength members that they contain by securing these strength members to the load bearing component of the splice.

Fifth, a splice should exploit certain standards and commonality among other optical components to make it universal. For example, since a splice should be field installable, it would be preferable that the splice use fiber termination mechanisms that are already in use in field-installable connectors. In addition to using similar mechanisms and tools as used in the connector field, the splice should also interengage within closures with known and commercially available holders such as those manufactured by Richco.

Sixth, the splice should be capable of coupling fibers independent of the buffer or coating diameter. That is, the splice should be capable of splicing fibers having buffer diameters ranging from 250 to 900 µm, which are common in the industry.

Although the prior art offers splices which provide some of these features, none provide all. For example, one common approach is a fused splice in which the optical fibers are fused together using an energy source such as a laser, electric arc, or gas flames to heat the fiber ends. Although such a design is advantageous from the standpoint of optical alignment and usually results in an optical coupling having a low insertion loss, it requires specialized equipment and does not exploit techniques and tools already in use for terminating connectors, thereby diminishing its versatility.

Another prior art approach to splicing is the use of a clamshell type splice as used, for example, in the CoreLink product line (offered by Tyco Electronics, Harrisburg, Pa.). In this design, two halves of a splice are urged together by resilient means such as a spring member. To effect the splice, a tool is inserted into the splice to wedge or cam the two halves apart to allow the fibers to be inserted. When the fibers are in place, the camming or wedging tool in removed and the splice halves clamp shut by virtue of the resilient means. Although this splice design has been effective in the past and provides for adequate optical alignment and simple field installation, it is not particularly durable. That is, there is a seam along its length, which is susceptible to dirt and other debris. Furthermore, axial loads on the cable are transmitted directly through the optical splice, rather than be transferred to a separate load-carrying component. Furthermore, the splice tends to be an unusual shape (typically an elongated rectilinear shape), and consequently does not interengage with standard holders. Finally, the clamping mechanism it uses is unique and not used in field installable connectors, thus, the tooling required for this splice is unique to this splice.

Yet another splice involves rotational actuation and is offered by Corning. Specifically, this splice involves one component rotating relative to another to cam down on a fiber joint and hold the fibers together. Although this device is advantageous from the standpoint of its field installability, the fiber alignment may suffer. Specifically, since the rotational actuation involves asymmetric radial pressure on the fibers within, a certain degree of fiber dislocation may occur during actuation. Furthermore, this design is not particularly durable. Specifically, to accommodate the rotational actuation, the housing is split and has annular seam. Such a seam is susceptible to dirt and other debris. Furthermore, this design is susceptible to axial loads translated through the optical fibers since the loads are not transferred to a load bearing component in the splice.

Applicants have therefore identified a need for a splice that provides good fiber alignment, field installability, durability, and versatility with respect to using commercially available tools and splice accessories. The present invention fulfills this need among others.

SUMMARY OF INVENTION

The present invention provides a splice that overcomes the shortcomings of the prior art by providing a standard clamping mechanism contained in a robust, seamless housing. Specifically, the splice uses a clamping mechanism that is known and commercialized in field-installable connectors. Thus, it exploits the termination tools and techniques already employed in the field. Furthermore, the clamping mechanism is axially actuated from one end, thereby eliminating the need for the housing to provide side access or to be articulated to accommodate the clamping mechanism contained within. The housing of the splice can therefore be seamless from one end to the other. Such a seamless design makes the splice not only particularly durable with respect to dirt and debris, but also capable of handling significant axial loads on the fibers by transferring the load to the housing and away from the clamping mechanism. To this end, the housing is configured to attach to the load-carrying components of the cable.

One aspect of the invention is a slice having a robust, essentially seamless housing. In one embodiment, the splice comprises: (a) an elongated housing having a first end with a first opening, a second end with a second opening, and a central cavity, the housing being essentially seamless between the first and second ends; (b) a clamping mechanism disposed in the central cavity and comprising at least a platform defining a fiber-receiving channel open to both first and second openings, a first member adjacent to the fiber-receiving channel and having at least one cam surface, and a second member having a second cam surface, the first and second cam surfaces cooperating such that relative movement of the first and second members toward the first end causes the first member to move toward the fiber-receiving channel and an actuator to cause relative movement of the first and second members toward the first end; (c) a first buffer crimp disposed at the first opening; and (d) a second buffer crimp disposed at the second opening.

Another aspect of the invention is a process for optically coupling fibers in the splice while securing the cables to the splice housing. In one embodiment, the process comprises: (a) inserting the first fiber and buffer into the first opening such that the first fiber is received in the fiber-receiving channel; (b) crimping the first buffer crimp around the first buffer to secure the first cable to the housing; (c) inserting the second fiber and buffer into the second opening such that the second fiber is received in the fiber-receiving channel and contacts the first fiber; (d) moving the actuator toward the first end to cause the first member to urge the first fiber and second fibers into the fiber-receiving channel and secure them thereto; and (e) crimping the second buffer crimp around the buffer of the second cable.

The splice and process for splicing of the present invention achieve most, if not all, of the desirable features of a splice identified by Applicants. Specifically, as mentioned above, because the housing of the splice is essentially seamless, it is durable and not susceptible to dirt and debris.

The splice can also handle high axial loads on the cables by channeling the axial force to the housing and away from the clamping mechanism and the optical coupling. Specifically, because the housing is robust and discrete from the clamping mechanism, it can act as the load bearing member of the splice. To this end, the load bearing portions of the cables are connected to the housing in different ways. For example, the buffer of the cable may be crimped by the buffer crimp, which, in turn, is operatively connected to the housing. Additionally, with jacketed cable, the strength members of the cables may be secured to the outer surface of the housing.

The approach of the present invention also facilitates a great degree of standardization. As mentioned above, the splice of the present invention uses a clamping mechanism that is already in use in field-installable connectors such as the Lightcrimp LC connector and Lightcrimp SC (commercial available through Tyco Electronics, Harrisburg Pa.). Therefore, technicians already have a level of familiarity with the clamping mechanism, as well as the compliment of tools required for terminating the fibers in the splice.

Furthermore, the housing can be used universally in commercially available brackets, clips and holders. This universal design is possible because the axial actuation requires no special housing geometry. That is, as mentioned above, the housing does not need to accommodate the clamping mechanism by providing side access or by being articulated to allow movement of the clamping mechanism. In one embodiment, the housing is symmetrical allowing it to be mounted in any radial orientation.

The process of terminating the splice is also robust and not prone to error. For example, in one embodiment, the splice comprises a buffer stop, which allows a technician to insert the fiber until the buffer abuts the stop, regardless of its diameter. This, coupled with the fact that the clamping mechanism of the present invention involves a relatively long point of engagement, allows the cables to be inserted in a controlled and predictable way. The predictability of the fiber insertion also facilitates automation in the splicing process.

Still other benefits and advantages of the splice of the present invention will be apparent to one of skill in the art in light of this disclosure.

BRIEF DESCRIPTION OF DRAWINGS

FIG. 2 is a perspective cross sectional view of the splice of FIG. 1.

FIG. 3 is an alternative embodiment of the splice of FIG. 2.

DETAILED DESCRIPTION

Figure 1:
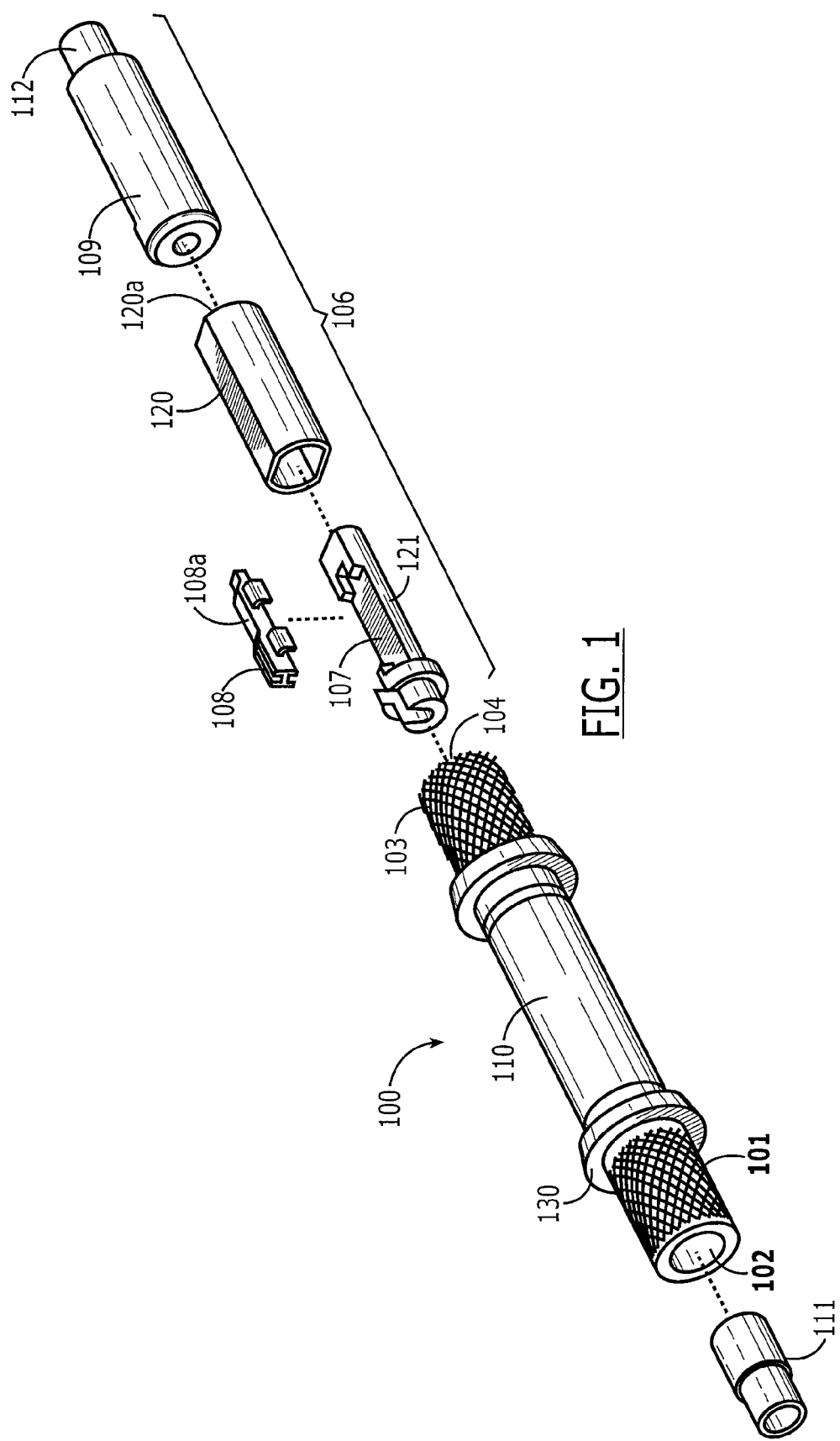
FIG. 1 is an exploded view of a preferred embodiment of the splice of the present invention.

Referring to FIG. 1, an embodiment of the splice 100 of the present invention is shown. The splice comprises an elongated housing 110 having first end 101 with a first opening 102, a second end 103 with a second opening 104, and a central cavity 105. The housing is essentially seamless between the first and second ends. Disposed in the central cavity 105 is a claming mechanism 106. The clamping mechanism 106 defines a platform 121 having fiber-receiving channel 107 open to both the first and second openings 102, 104, a first member 108 adjacent to the fiber-receiving channel, and a second member 120 adjacent the first member 108. The first and second members have first and second cam surface 108a, 120a which cooperate such that, when one of either the first or second member is move axially toward the first end 101, the first member 108 moves toward the fiber-receiving channel. The clamping mechanism 106 also comprises an actuator 109 to move either the first or second member 108, 120 forward axially. The splice 100 also comprises a first buffer crimp 111 disposed at the first end 101, and a second buffer crimp 112 disposed at the second end 103. These elements are described in greater detail below.

The housing 110 of the splice of the present invention serves preferably several functions. First, it serves to contain the clamping mechanism 106. To this end, the housing 110 is essentially seamless from the first opening to the second opening to protect the clamping mechanism 106 from dirt and debris. As used herein, the term "essentially seamless" means no joints to facilitate relative movement of components of the housing. This essentially seamless construction is possible because the clamping mechanism is actuated axially, requiring access only from the second opening 104.

Furthermore, the only openings in the housing—i.e., the first and second openings 102, 104, are preferably sealed or covered by boots 401 (FIG. 4) which are slid over the first and second ends 101, 103 after the fiber cables are terminated. In one embodiment, the housing comprises annular shoulders 130 proximate each end, and against which the boots 401 abut when installed. In addition to providing a stop for the boots, these shoulders also create a seal with the boots (and jacket 403) thereby sealing the first and second openings of the splice from dirt and debris. The robust and seamless housing offers significant advantages in terms of durability over prior art splices having housings with seams to provide access to the clamping mechanism or otherwise facilitate movement of the clamping mechanism.

Because the housing 110 is particularly robust in the present invention, it may also serve to absorb axial loads applied to the cables. Specifically, rather than have the clamping mechanism bear the stress of axial loads applied to the cables, it is preferable to transfer these loads to the housing. Loads may be transferred to the housing in various ways in accordance to the present invention. For example, the buffer of each fiber may be secured to its respective buffer crimp, which, in turn, is operatively connected to the housing such that any load applied to the buffer is transferred to the housing. Specifically, buffers 501a, 502b of cables 501, 502, respectively, can be crimped to the first and second buffer crimps 111, 112, respectively.

Although crimping a buffer to a buffer crimp is known in the art, Applicants have found that the use of a hexagonal crimp die provides suitable plastic compressive deformation of the eyelet, while still effectively captivating the buffer. Furthermore, Applicants have found that internally threading the buffer crimps 111, 112 enhances the retention to the cable buffer.

The first buffer crimp may be operatively connected to the housing in different ways. For example, the first buffer crimp 350 may be integral with the housing 110a as shown in FIG. 3. Alternatively, the first buffer crimp may be a discrete component, which is secured to the housing. In this regard, the first buffer crimp 111 may be secured by way of a friction fit (press fit), threaded interengagement, adhesive connection, welded/soldered/braised joint, or any other means for securing one component to another. Preferably, the first buffer crimp is press fit in the housing. By having the first buffer crimp 111 discrete from the housing, the threads may be machined into the buffer crimp apart from the housing to avoid leaving debris in the housing. By way of contrast, if the first buffer crimp 111a is integral to the housing 110a, as shown in the alternative embodiment of FIG. 3, the internal threads must be machined in situ. This can leave debris in the housing, which is difficult to remove given the narrowness of the first opening 102a.

The second buffer crimp 112 is also operatively connected to the housing. Unlike the first buffer crimp, however, it cannot be permanently secured to the housing because it preferably moves with the actuator 109, which is slidably disposed within the housing 110 as shown in FIG. 1. Therefore, to have the load transfer from the second cable, to the second buffer crimp, and then to the housing, it is preferable to have the actuator snuggly held by the housing such that significant force is required to move the actuator either forward, and, more importantly, backward relative to the first end.

The housing may also absorb load from jacketed cables through the cables' strength members. Specifically, the strength members may be arranged around the outside of the housing and secured thereto by a crimp eyelet. Referring to FIG. 1, the housing preferably comprises texturing at the first and second ends 101, 103 to enhance the retention of the strength members to the housing. In this embodiment, the texturing is knurling, although any type of texturing including barbs and ridges may be used to increase the friction between the strength members and the housing.

The housing may be made of any durable material. Suitable materials include, for example, metal such as aluminum, steel, stainless steel, etc., or tough plastics, such as polyetherimide. In a preferred embodiment, the housing comprises aluminum. The housing may be integrally molded or it may be formed from different components which are integrated (e.g., welded, glued, press fit) to form a unitary structure having essentially no seams.

Figure 7:
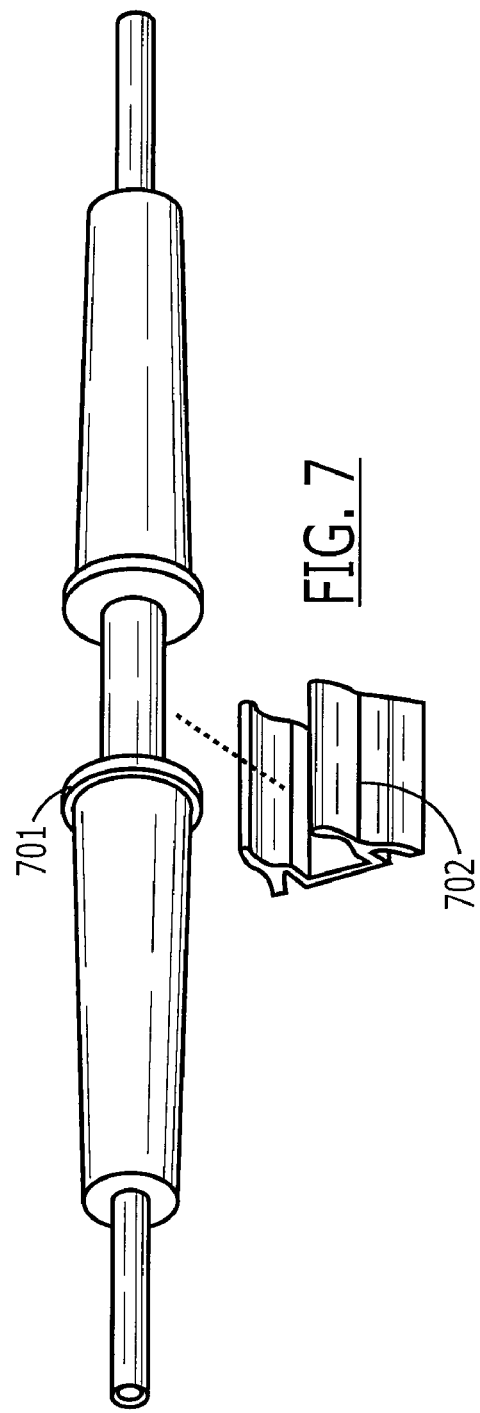
FIG. 7 is a perspective view showing the splice of the present invention being received in a common clip.

The shape of the housing may vary according to the application. Preferably, the housing is symmetrical such that it may be mounted in a splice holder in any orientation. For example, referring to FIG. 7, a cylindrical housing 701 is configured to be received in a standard mounting clip 702 in any radial orientation.

Figure 8:
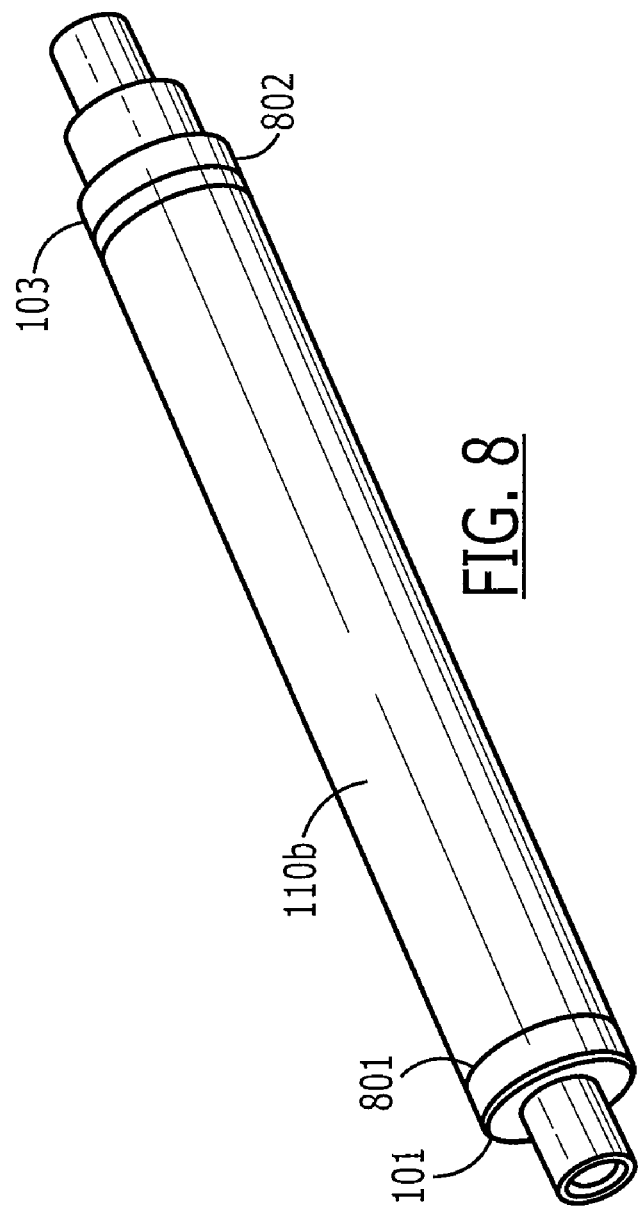
FIG. 8 is a perspective view showing the splice of the present invention marked for field installation.

Given the symmetry of the preferred embodiment of the housing, it is preferable to mark the first and second ends, 101, 103, to make them obvious for field installation of the fibers (discussed below). For example, referring to FIG. 8, one annular ring 801 is marked (in this case molded) on the housing 110b at the first end 101, and two annular rings 802 are marked on the second end 103. It is also worthwhile to mention that this embodiment of the housing 110b is designed for non-jacketed cable as opposed to housing 110 (FIG. 1), which has texturing for the strength members and shoulders 130 for the boots.

Referring back to FIG. 1, the clamping mechanism functions to secure and optically align the first and second fibers. The clamping mechanism is known and is disclosed, for example, in U.S. Patent Application No. 20070127873, which is hereby incorporated by reference.

Generally, the clamping mechanism 106 has a top and bottom and front and back orientation, at least one optical axis, and a pre-actuated state in which the second fiber is not secured to the clamping mechanism and a post-actuated state in which the second fiber is secured to the clamping mechanism. The clamping mechanism comprises a platform 121 disposed in the housing 110 and fixed relative thereto both radially and axially. The platform defines the fiber-receiving channel 107 along the optical axis to receive the first and second fibers 501b, 502b (see FIG. 5). The fiber-receiving channel is open to the first and second openings 102, 104. The first member 108 is disposed in the housing 110 above and adjacent to the fiber-receiving channel 107. The first member has a first cam surface 108a. A second member 120 is disposed in the housing and is axially slidable therein. The second member has a cam surface 120a adjacent the first cam surface 108a and is configured such that, upon forward motion of the second member, the first member is urged downward (or into the platform 121) as a result of a camming action between the first and second cam surfaces 108a, 120a.

Although in the embodiment shown in FIG. 1 the first member 108 remains stationary relative to the platform 201 and the second member moves forward, other embodiments are possible. For example, the slope of the first and second cam surfaces 108a and 120a could be reversed, in which case, the second member 120 would remain stationary relative to the housing, while the first member would move forward during actuation. In such an embodiment, the second member may be integral to the housing 110 since it is not moving.

The actuator 109 is disposed slidably within the housing 110 behind and adjacent to the second member and configured, such that, when moved forward, it forces the second member forward relative to the first member. Alternatively, the actuator could be configured to push the first member forward relative to the housing.

Referring to FIG. 1, the buffer stop 150 functions to position the fiber axially. In a preferred embodiment, the same buffer stop is used to position buffered fibers of varying diameter—e.g. 250 to 900 μm. The buffer stop comprises a lead-in portion 150a, which tapers into a narrow portion 150b that is aligned with the fiber-receiving channel 107. The lead-in portion serves to guide the bare fiber 501b into the narrow portion 250b, and the narrow portion, in turn, serves to guide the bare fiber 501b into the fiber-receiving channel 107.

The degree of taper of the lead-in portion 205a is optimized such that it can accommodate cables of varying diameter. It should be understood that if the lead-in portion 150a is tapered, the buffer 501a on a 900 μm cable, for example, will abut the buffer stop 150 at an earlier point than that of a 250 μm cable. In other words, the buffer 501a of a 900 μm cable cannot be inserted into the buffer stop 150 as far as that of a 250 μm cable. Consequently, if both the 900 μm and 250 μm cables are stripped such that an equal length of bare fiber 501b extends from the buffer 501a, then the fiber of the 900 μm cable would not extend into the fiber-receiving channel as far as the that of the 250 μm cable. This difference in the extension of the bare fiber into the fiber-receiving channel for cables of different diameters is referred to herein as "differential."

The differential may be addressed in different ways to enable the same splice to be used for cables of different diameters. First, the taper might be very steep—i.e., approaching normal to the optical axis such that buffers of the 250 and 900 μm cables abut the buffer stop at approximately the same axial point, thereby minimizing the differential. However, this approach compromises the lead-in function of the buffer stop, as the bare fiber is more likely to stub against the buffer stop rather being lead into the narrow portion. This can cause damage to the bare fiber. Alternatively, the 250 and 900 μm cables may be stripped such that the bare fiber extends further for the 900 μm cable to compensate for the earlier abutment of the 900 μm buffer against the buffer stop. This approach, however, has the drawback of requiring different installation procedures depending on the diameter of the cable, which is contrary to the objective of standardizing the splice process.

A preferred approach utilizes an optimized taper which is relatively steep to minimize the differential, but not too steep as to compromise its lead-in functionality. Although this will result in an appreciable differential, the clamping mechanism of the present invention is able to accommodate it. That is, the clamping mechanism of the present invention has a relatively long length of engagement in the fiber-receiving channel. This is due to the a relatively elongated, planar surface of the first member bearing down on the fiber in the fiber-receiving channel. For example, in commercial embodiments, the length of engagement is about 4 mm. This relatively long length provides the tolerance necessary to accommodate the differential resulting from a common splice being used for cables of different diameter.

Preferably, the buffer stop 150 is integral with the housing 110 as shown in FIG. 2. Alternatively, the buffer stop 350 can be a discrete component as shown in FIG. 3. In this embodiment, buffer stop 350 is inserted through the second opening and is pushed forward until it abuts a shoulder 351 on the inside of the housing 110a.

Figure 5:
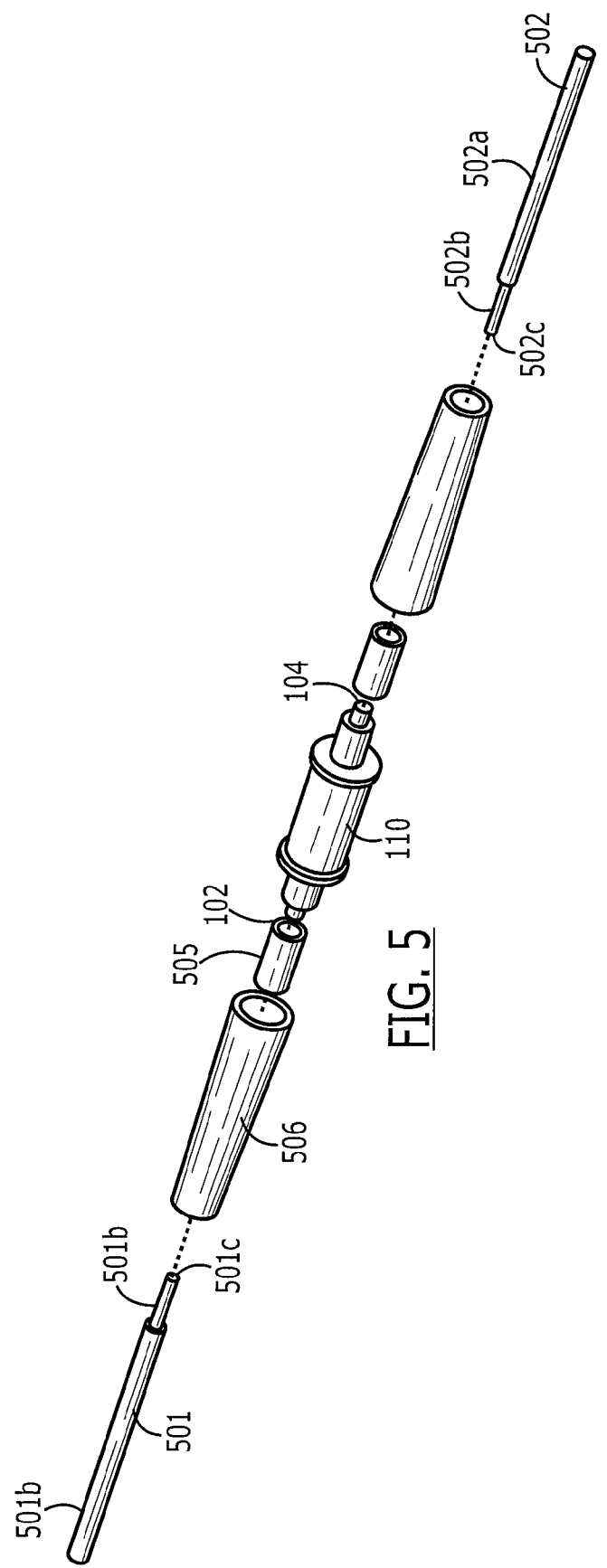
FIG. 5 is an exploded view of the splice of the present invention with the first and second cables.

Referring to FIG. 5, the process of terminating fibers in the splice will be described. Before terminating the fibers, the cables must be stripped and cleaved such that the bare fiber 501b, 502b extends beyond the buffer 501a, 502a of cables 501, 502, respectively. This step may be performed using existing stripping and cleaving tools available commercially from multiple manufacturing sources, such as Clauss and Furukawa Electric Company. Preferably, the bare fiber extends beyond the buffer by about 8 mm. Once the fiber cables are prepared, the first fiber 501b is inserted into the first opening 102 such that the first fiber 501b is received in the fiber-receiving channel 107 and until the buffer 501a abuts the buffer stop 150. At this point, the first buffer crimp 111 is crimped around the buffer to secure the first cable to the housing. Next, the second bare fiber 502b is inserted into the second opening 104 such that the second fiber 502b is received in the fiber-receiving channel 107 until the end 502c of the second fiber 502b contacts the end 501c of the first fiber 501b. Optionally, optical gel may be added prior to the insertion of the second fiber to enhance the optical coupling of the first and second fibers. With the second bare fiber optically coupled to the first bare fiber, the actuator 109 (FIG. 1) is moved toward the first end to urge the first member into the first and second fibers and secure them in the fiber-receiving channel. Finally, the second buffer crimp is crimped around the buffer of the second cable to secure it to the housing.

Figure 4:
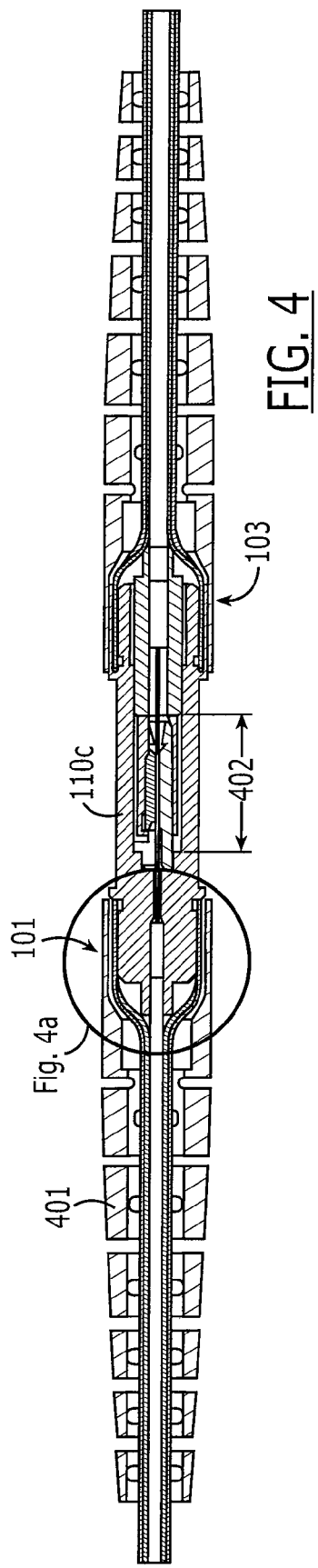
FIG. 4 is a cross sectional view of an alternative embodiment of the splice of the present invention with jacketed cables terminated thereto.
Figure 4A:
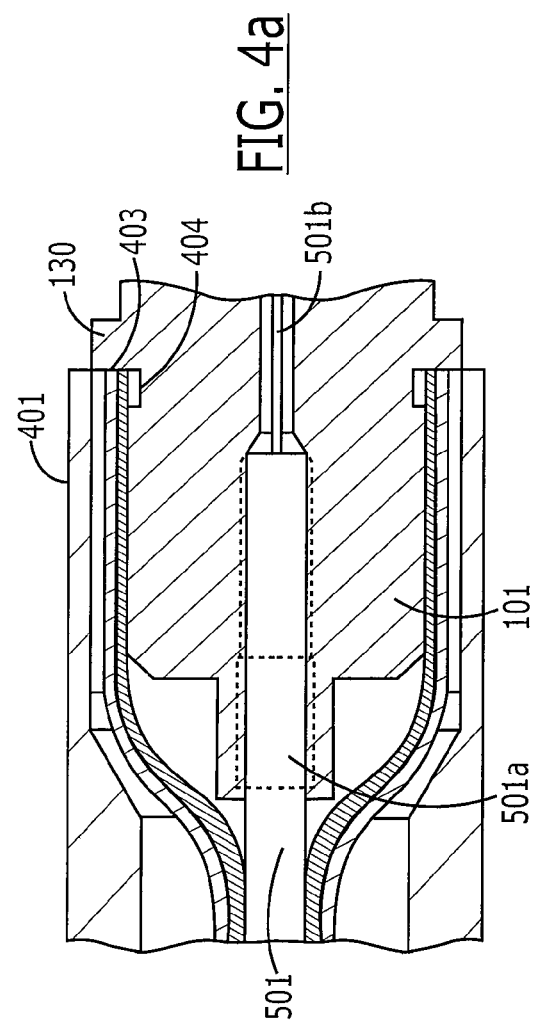
FIG. 4a is an exploded view of a portion of FIG. 4.

Referring to FIG. 4, if the fiber cable is jacketed and has strength members 404, the process further comprises laying the strength members 404 over the ends 101, 103 of the housing and crimping them in place, along with the jacket 403, with a crimp eyelet 402. Next, a boot 401 is slid over the housing end, further securing the strength members to the housing and sealing the sealing the openings of the housing from dirt and debris. (Note that FIG. 4 shows an alternative embodiment in which the first buffer crimp and the buffer stop are both integral with the housing 110c.)

Figure 6:
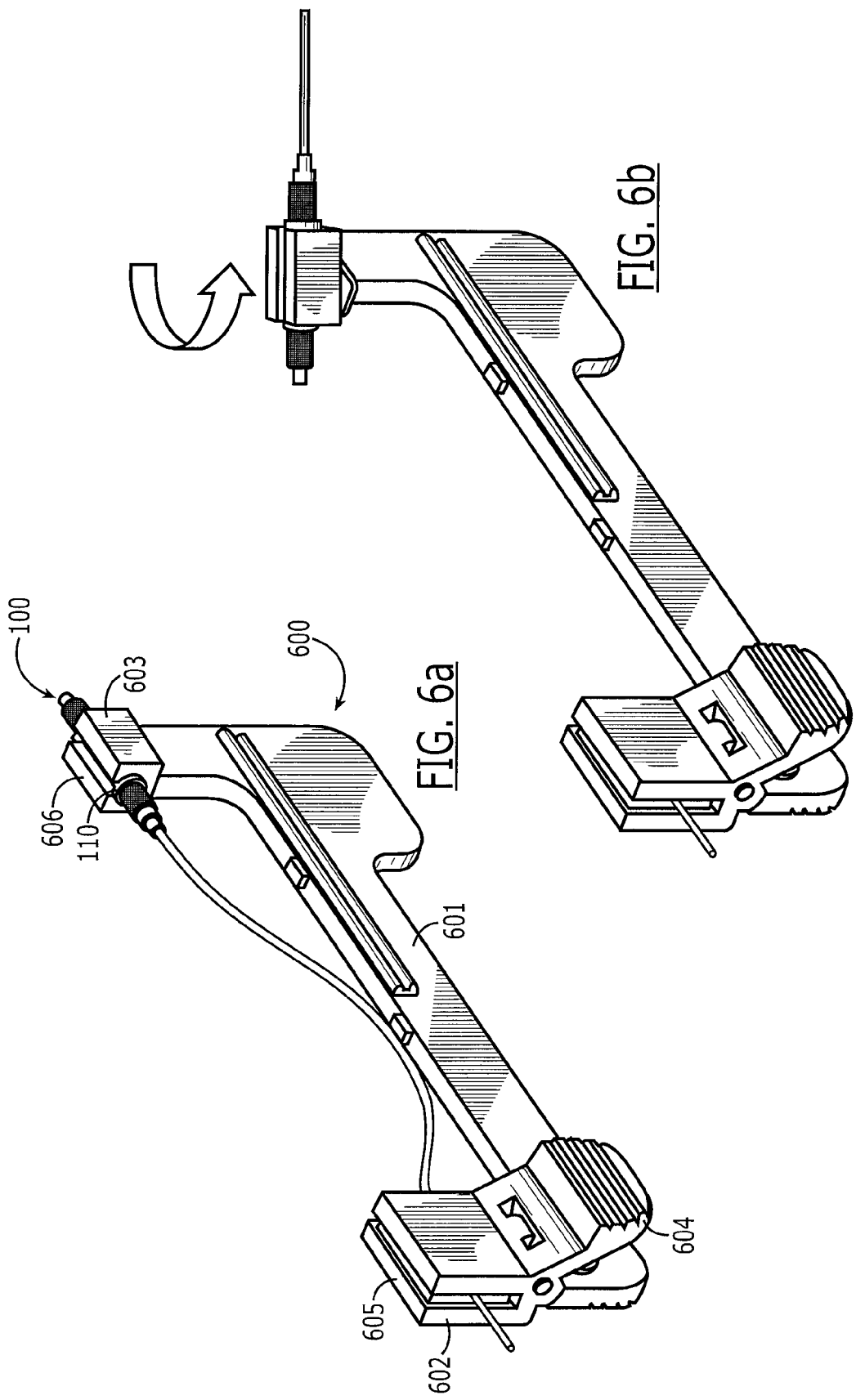
FIGS. 6a and 6b are perspective views of the installation device of the present invention.

The above process is simplified by virtue of a compact tool that can be used for terminating fibers in the splice of the present invention. Referring to FIGS. 6a and 6b, the installation device 600 is shown. The device comprises a base 601 from which extend a cable clamp 602 and a swivel splice clamp 603. The cable clamp 602 comprises a hinged mechanism having jaws 605, which are resiliently biased closed, and a lever 604 to open the jaws. The swivel splice clamp also has jaws 606 which are biased closed and firmly grip the splice housing 110 when inserted therein.

In operation, the splice 100 is inserted into the jaws 606 and a stripped first cable is inserted into the jaws 605. While squeezing the lever 604 the first cable is inserted into the first opening of the splice and is pushed forward to form a bend in the fiber. At this point, the lever is released, causing the fiber to be held relative to the splice. The bend provides an urging force to urge the push the cable into the splice to ensure that the buffer of the cable abuts the buffer stop as described above. The first buffer crimp is then crimped to secure the first cable to the splice housing 110.

Once the first cable is connected to the splice, the first cable is removed from the cable holder and the swivel splice clamp is rotated 180 degrees to present the second opening to the cable clamp. The same procedure is performed with the second cable. Before the second buffer crimp is crimped, however, the clamping mechanism is actuated to secure the first and second fibers in the fiber-receiving channel as described above. This actuation can be performed using standard tooling such as the Pro-crimper available through Tyco Electronics (Harrisburg, Pa.).

Therefore, the ruggedness of the splice housing and the axial actuation provides for a host of benefits including durability, standardization, and field installability using a compact and versatile tool. Still other benefits and application will be obvious to one of skill in the art in light of this disclosure.

What is claimed is:

1. A splice for connecting two segments of optical fiber cable, said splice comprising:
    an elongated housing having a first end with a first opening, a second end with a second opening, and a central cavity, said housing being essentially seamless between said first and second ends;
    a clamping mechanism disposed in said central cavity and comprising at least a platform defining a fiber-receiving channel open to both first and second openings, a first member adjacent to the fiber-receiving channel and having at least one cam surface, and a second member having a second cam surface, said first and second cam surfaces cooperating such that relative movement of said first and second members toward said first end causes said first member to move toward said fiber-receiving channel and an actuator to cause relative movement of said first and second members toward said first end;
    a first buffer crimp disposed at said first opening; and
    a second buffer crimp disposed at said second opening.

2. The splice of claim 1, further comprising:
    a buffer stop disposed in said housing between said first opening and said clamping mechanism, said buffer stop defining a lead-in portion tapering down to a narrow portion aligned with said fiber-receiving channel.

3. The splice of claim 2, wherein said buffer stop is integral with said housing.

4. The splice of claim 2, wherein said buffer stop is a discrete insert and said housing defines an inner shoulder at said first end against which said buffer stop abuts.

5. The splice of claim 1, wherein said first buffer crimp comprises internal threads.

6. The splice of claim 1, wherein said first buffer crimp is press fit into said housing.

7. The splice of claim 1, wherein said second buffer crimp is integral with said actuator and defines a passage aligned with said fiber-receiving channel.

8. The splice of claim 1, wherein said housing is integrally molded.

9. The splice of claim 8, wherein said housing is symmetrical.

10. The splice of claim 9, wherein said housing is cylindrical.

11. The splice of claim 1, wherein said housing is marked to indicate said first and second ends.

12. The splice of claim 1, wherein said first and second ends are textured to improve retention of strength members of a jacketed fiber cable.

13. A process for splicing first and second cables in a splice, said first and second cables being stripped such that first and second fibers extend beyond first and second buffers of said first and second cables, respectively, said slice comprising an elongated housing having first end with a first opening, a second end with a second opening, and a central cavity, a clamping mechanism disposed in said central cavity and defining a fiber-receiving channel open to both first and second openings, an actuator, and a first member adjacent to the fiber-receiving channel which moves toward said fiber receiving channel when said actuator is moved toward said first end, a first buffer crimp disposed at said first opening, and a second buffer crimp disposed at said second opening, said process comprising:
    (a) inserting said first fiber and buffer into said first opening such that said first fiber is received in said fiber-receiving channel;
    (b) crimping said first buffer crimp around said first buffer to secure said first cable to said housing;
    (c) inserting said second fiber and buffer into said second opening such that said second fiber is received in said fiber-receiving channel and contacts said first fiber;
    (d) moving said actuator toward said first end to cause said first member to urge said first fiber and second fibers into said fiber-receiving channel and secure them thereto; and
    (e) crimping said second buffer crimp around said buffer of said second cable.

14. The process of claim 13, wherein said fiber cable is jacketed and comprises strength members between a jacket and said buffer and said housing is textured at said first and second ends, said process further comprising:
    positioning the strength members over said textured ends; and
    placing a resilient member around said strength members to secure them to said housing.

15. The process of claim 13, further comprising:
    providing an installation device comprising a swivel splice clamp and a cable clamp and, prior to step (a), securing said housing in said swivel splice clamp and inserting said first cable in said cable clamp, and, prior to step (c), swiveling said swivel splice clamp 180 degrees and inserting said second cable in said cable clamp.

16. The process of claim 15, wherein step (a) comprises putting a bend in said first cable before securing said first cable to said cable clamp.

17. The process of claim 13, wherein said splice comprises a buffer stop in said housing between said first opening and said clamping mechanism, said buffer stop having a lead-in portion and a narrow portion, wherein step (a) comprises inserting said first fiber and buffer until said buffer abuts said buffer stop and said fiber extends through said narrow passage.

18. The process of claim 17, wherein said buffer ranges in diameter from 250 to 900 μm.

19. The process of claim 13, further comprising providing said splice, said housing being essentially seamless from said first end to said second end.

20. The process of claim 13, further comprising stripping said first and second fibers.

* * * * *